United States Patent [19]

Iwasa et al.

[11] 4,320,408

[45] Mar. 16, 1982

[54] METHOD OF FORMING ELECTROSTATIC IMAGE

[75] Inventors: Masakazu Iwasa; Hisashi Katou, both of Odawara; Satoru Honjo, Asaka, all of Japan

[73] Assignee: Fuji Photo Film Co., Ltd., Kanagawa, Japan

[21] Appl. No.: 81,530

[22] Filed: Oct. 3, 1979

[30] Foreign Application Priority Data

Oct. 6, 1978 [JP] Japan ............................... 53/123265
Dec. 13, 1978 [JP] Japan ............................... 53/154739

[51] Int. Cl.[3] ...................... G03G 15/044; H01J 61/06; G01D 15/06

[52] U.S. Cl. .................................... 346/159; 313/207; 315/111.81

[58] Field of Search .................... 346/159; 355/3 CH; 315/206, 207, 111.8; 361/225, 229, 230; 101/1, DIG. 13; 430/31, 32, 36, 48, 53, 937; 313/207

[56] References Cited

U.S. PATENT DOCUMENTS 3,776,132 12/1973 Rarey et al. ............ 101/DIG. 13 X
3,863,261 1/1975 Klein .................................. 346/159
3,980,474 9/1976 Jackson ........................... 346/159 X
3,986,189 10/1976 Van Biesen et al. ................ 346/159
4,088,891 5/1978 Smith et al. ............ 101/DIG. 13 X
4,123,156 10/1978 Inowa et al. ................ 355/3 CH X
4,155,093 5/1979 Fotland et al. ....................... 346/159
4,160,257 7/1979 Carrish ................................ 346/159

*Primary Examiner*—Aristotelis M. Psitos
*Attorney, Agent, or Firm*—Gerald J. Ferguson, Jr.; Joseph J. Baker

[57] ABSTRACT

A control electrode assembly is provided between a corona discharger and an electrostatic recording medium. The control electrode assembly has a pair of conductive electrodes interposing therebetween a insulating layer having a through hole extending from the upper conductive electrode to the lower conductive electrode. Selected one of the conductive electrodes is grounded through a change-over switch, which connects the selected electrode to the ground and disconnects the other non-selected electrode from the ground to electrically open it. Corona ions from the corona discharger charge the electrically opened conductive electrode to establish an electric field within the through hole. The corona ion current passing through the through hole can be modulated by operating the change-over switch to control the direction of the electric field established within the through hole in accordance with an image signal to form an electrostatic image on a recording medium.

12 Claims, 9 Drawing Figures

METHOD OF FORMING ELECTROSTATIC IMAGE

BACKGROUND OF THE INVENTION

1. Field of the Invention

This invention relates to a method of forming an electrostatic image, and more particularly to a method of forming an electrostatic latent or visible image in which a control electrode assembly comprising a pair of parallel spaced perforated electrodes interposing an insulating layer therebetween is used to modulate a corona ion current or a toner particle current to form an electrostatic image on an electrostatic recording medium.

2. Description of the Prior Art

In an electrostatographic method as disclosed in preprints for "5th National Conference of Society of Image Electronics" (1977) entitled "Investigation of Facsimile Receiver Using Ion Current Electrostatic Recording" and Japanese Patent Publication No. 20094/1975, an electric voltage is applied to a control electrode assembly comprising an insulating layer and a pair of parallel perforated conductive electrodes interposing the layer to establish an electric field within the perforations thereof and the electric field serves to modulate a corona ion current passing through the perforations to form an electrostatic latent image on an electrostatic recording medium.

The above conventional method of forming an electrostatic latent image using an ion current will hereinbelow be described in more detail referring to FIGS. 1 and 2. In FIG. 1, a corona discharger 1 having a wire anode and a cylindrical cathode provides corona discharge between the anode and the cathode. The corona ions generated by the corona discharger 1 are attracted to a backside electrode 2 travelling through a hole 9 in a control electrode assembly 6 disposed between the corona discharger 1 and the backside electrode 2. High voltages are applied to the anode of the corona discharger 1 and the backside electrode 2 from high voltage sources 3 and 4, respectively. An electrostatic recording paper 5 is supported on the backside electrode 2.

The control electrode assembly 6 comprises an insulating plate 7 and a pair of copper films 8*a* and 8*b* attached to opposite surfaces thereof. The copper films 8*a* and 8*b* function as a pair of conductive electrodes, respectively. The control electrode assembly 6 is provided with at least one through hole 9 having a small diameter. An electric field is established within the through hole 9 when an electric voltage is applied between the conductive electrodes 8*a* and 8*b*. As will be described in more detail hereinbelow, a corona ion current passing through the hole 9 can be controlled by controlling the direction of the electric field established within the hole 9. Thus the corona ion current passing through the control electrode assembly 6 is modulated by controlling the direction of the electric field applied to the electrodes 8*a* and 8*b* to form an electrostatic latent image in the form of a dot pattern on the electrostatic recording paper 5. When the control electrode assembly 6 is provided with a number of such holes, the upper conductive electrode 8*a* is devided into portions each surrounding one of such holes.

Upon formation of the electrostatic latent image, a high voltage of several KV is applied to the backside electrode 2 and a voltage of several tens of volts (assuming that the hole 9 has a diameter of several tens of microns) is applied between the conductive electrodes 8*a* and 8*b* of the control electrode assembly 6 by a signal source 10. Then an electric field $E_F$ is established within the hole 9 and an electric field $E_P$ is established between the corona discharger 1 and the backside electrode 2 as shown in FIG. 2. The corona ions generated by the discharger 1 pass through the hole 9 depending on the vector sum of the vectors of the fields $E_F$ and $E_P$. Thus, it is possible to control the ion current passing through the hole 9 by controlling the direction of the vector of the electric field $E_F$ in the hole 9.

The above described electrostatic recording method using the control electrode assembly 6 can be conveniently used with an electrostatic recording medium which can be used repeatedly.

Generally, in a conventional electrostatic recording system, a discharge electrode is brought into contact with an electrostatic recording medium or is spaced therefrom by a distance of several tens of microns. Such close positioning of the discharge electrode does not bring about any problem in case that the recording medium is not repeatedly used as in facsimile. However, in case that the recording medium is repeatedly used, a serious problem arises due to the extremely small space between the discharge electrode and the recording medium. While the recording medium is repeatedly subjected to processes of latent image formation, development, transfer of image and cleaning, the small space between the electrostatic recording medium and the discharge electrode will be clogged with the residual toner particles and/or dusts. This will lower the quality of the obtained image and in the worst case it would prevent formation of an electrostatic latent image. The cleaning, therefore, should be conducted perfectly. However, it is practically impossible to perfectly clean the surface of the recording medium, and there would be required frequent maintenance of the system.

The electrostatic recording method using the control electrode assembly is advantageous in that the control electrode assembly can be spaced from the recording medium by a distance of one to several millimeters and accordingly the perfectness of the cleaning would not be required.

However, this method has a disadvantage that the voltage which should be applied to the control electrode assembly must be increased when the diameter of the hole 9 is increased. In order to obtain the increased voltage, a complicated switching circuit would be required.

Generally, the effectiveness of the electric field preventing the corona current from passing through the hole 9 is reduced as the thickness of the control electrode assembly is reduced for a given diameter of the hole 9. The effectiveness of the electric field can be increased by increasing the voltage applied to the control electrode assembly. However, an increased voltage would generate electric sparks within the control electrode assembly. The electric field should normally be of several to several tens of KV/cm. Thus a high voltage as high as from several hundred V to several KV would be required when the diameter of the hole 9 is about 1 mm. In order to conduct switching of such a high voltage, an extremely complicated costly switching circuit is required.

SUMMARY OF THE INVENTION

The primary object of the present invention is, therefore, to provide an electrostatic image forming method using a control electrode assembly in which the corona ion current passing through the hole of the control electrode assembly can be modulated without any voltage applied to the control electrode.

Another object of the present invention is to provide an improved method of forming an electrostatic latent image in which the size of the dots forming the electrostatic latent image can be changed without changing the diameter of the hole in the control electrode assembly.

In accordance with one aspect of the present invention, an electric field can be established within a hole in a control electrode assembly having a pair of spaced conductive electrodes only by grounding one of the conductive electrodes and electrically opening the other. When corona ions generated by a corona discharger stick to the conductive electrodes, the electrically opened electrode is charged by the corona ions to have an electrical potential higher than that of the grounded electrode since the latter is grounded and would not be charged by the corona ions. The potential difference between the two conductive electrodes establishes an electric field therebetween.

In accordance with another aspect of the present invention, a second electric field is established between the control electrode assembly and an electrostatic recording medium. The size of the dots forming an electrostatic latent image can be changed without changing the diameter of the hole in the control electrode assembly. In this case, it is controlled only by controlling the strength of the second electric field.

DETAILED DESCRIPTION OF THE INVENTION

Figure 3:
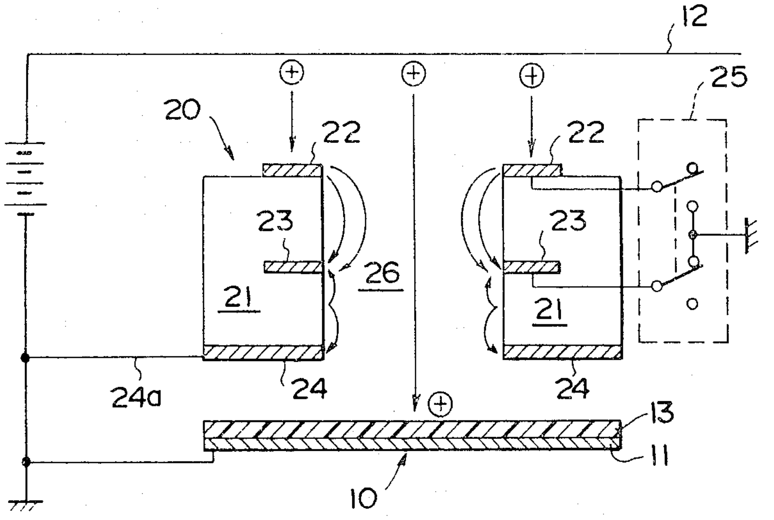
Figure 4:
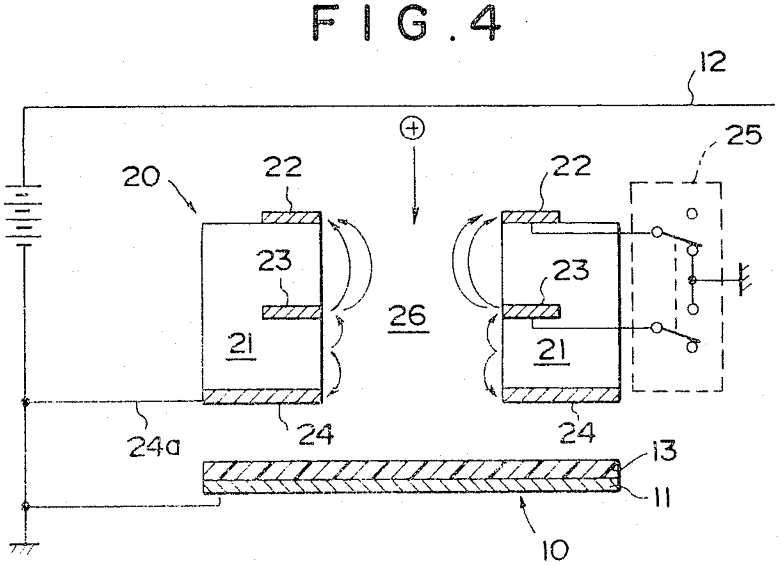

FIGS. 3 and 4 illustrate the principle of modulating the corona ion current in accordance with the present invention.

In FIGS. 3 and 4, a control electrode assembly 20 is disposed between an electrostatic medium 10 and a wire anode 12 of a corona discharger the cathode of which is not shown. The electrostatic recording medium 10 comprises a backside electrode 11 and an electrostatic recording layer 13 disposed thereon. The control electrode assembly 20 comprises an insulating body 21 and upper, intermediate and lower conductive electrodes 22, 23 and 24 supported thereby. The lower conductive electrode 24 is grounded through a line 24*a*. The upper and intermediate conductive electrodes 22 and 23 are selectively grounded through a change-over switch 25 so that selectively one is grounded and the other is electrically opened as shown in FIGS. 3 and 4. The upper or intermediate conductive electrode 22, 23 has an electrical potential which is 0 or equal to the potential of the cathode of the corona discharger (not shown) when it is grounded. Said change-over switch 25 may be a mechanical switch such as an electric relay or a lead relay, or an electronic switch means like a transistor switch. The control electrode assembly 20 is further provided with a through hole 26 extending from the upper surface to the lower surface thereof.

When the upper conductive electrode 22 is electrically opened and the intermediate conductive electrode 23 is grounded by the change-over switch 25 as shown in FIG. 3, corona ions from the wire anode 12 of the corona discharger charge the upper electrode 22 and the inner wall surface of the hole 26, whereby an electric field directed to the grounded lower conductive electrode 23 is established within the hole 26 as shown by arrows. Accordingly, at this stage, positively charged corona ions can pass through the hole 26 downward. At this time, the corona ions adhering to the inner wall surface of the hole 26 between the intermediate conductive electrode 23 and the lower conductive electrode 24 establishes electric fields directed toward both the intermediate conductive electrode 23 and the lower conductive electrode 24. However, the electric field directed to the latter is stronger than that directed to the former. Therefore, the electric fields do not prevent the downward flow of the corona ion current through the hole 26.

On the other hand, when the upper conductive electrode 22 is grounded and the intermediate conductive electrode 23 is electrically opened as shown in FIG. 4, corona ions from the corona discharger establishes an electric field directed to the upper conductive electrode 22. Thus, the downward flow of the corona ion current is prevented.

Figure 1:
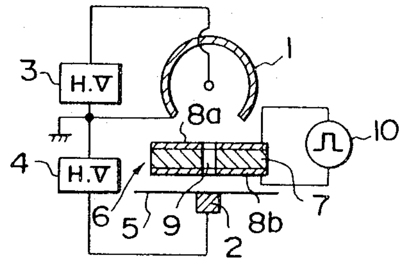
FIG. 1 PRIOR ART
FIG. 1 is a schematic view illustrating a conventional method of forming an electrostatic latent image using a control electrode assembly with a through hole.
Figure 2:
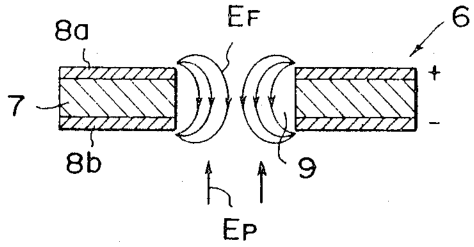
FIG. 2 PRIOR ART
FIG. 2 shows an electric field within the through hole of the control electrode assembly of FIG. 1, FIGS. 3 and 4 are cross-sectional views illustrating the principle of modulating a corona ion current in accordance with this invention.
Figure 5:
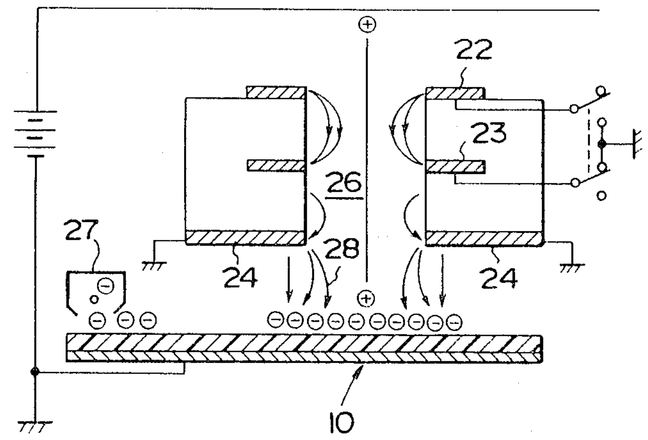
FIG. 5 is a cross-sectional view illustrating the principle of controlling the size of dots.

The size of the dots for forming an electrostatic latent image on the electrostatic recording medium 10 can be changed without changing the diameter of the through hole 26 as described hereinbelow. As shown in FIG. 5, the recording medium 10 is uniformly charged in advance by means of a charger 27. The charge of the recording medium 10 establishes an electric field 28 between the lower conductive electrode 24 and the recording medium 10. The electric field 28 bulges into the area under the hole beyond the edge of the hole 26. Degree of the bulge of the electric field 28 depends upon the strength thereof. The corona ions are deposited on the recording medium within the bulging portion of the electric field 28. Thus, the size of the dot can be decreased by strengthening the electric field 28, and it can be increased by weakening the electric field 28. Thus, the size of the dot can be controlled by controlling the voltage of the charge on the backside of the electrode 11 thereof.

When the electric field 28 does not exist, the corona ions passing through the hole 26 generally diverge outward after passing therethrough. Thus the resulting size of the dot will be increased than the diameter of the hole 26. The size of the dot is increased as the space between the lower side of the control electrode assembly 20 and the recording medium 10 is increased. If the space is too large, the charge density of the latent image would be low and accordingly the quality of the obtained image is also low. Therefore, said space is generally limited to about 2 mm.

Said uniform charging of the recording medium also serves to increase the quality of the obtained image, since the uniform charge attracts the oppositely charged corona ions and increases the charge density on the recording medium 10.

Figure 6:
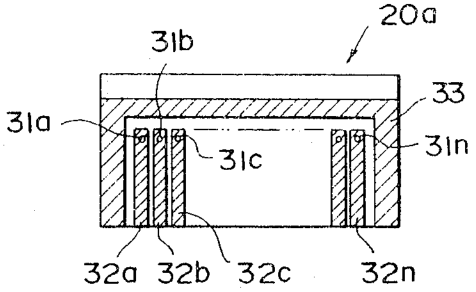
FIG. 6 is a plan view of an example of the control electrode assembly which is employed in this invention.
Figure 7:
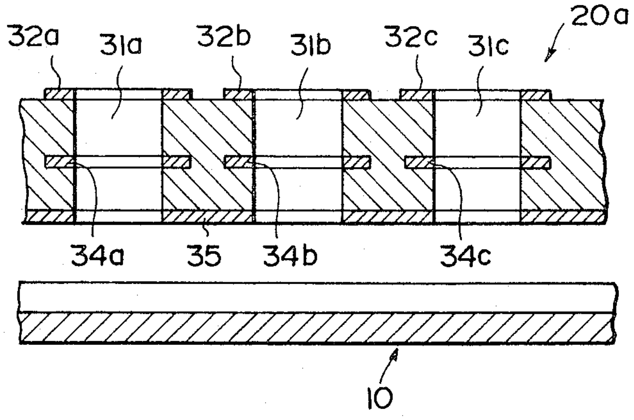
FIG. 7 is a cross-sectional view of the control electrode assembly of FIG. 6.

The control electrode assembly may be provided with a plurality of through holes as shown in FIGS. 6 and 7. In FIGS. 6 and 7, a control electrode assembly 20*a* has a plurality of through holes 31*a*, 31*b*, . . . 31*n*. The through holes 31*a* to 31*n* are surrounded by juxtaposed conductive strips 32*a* and 32*n*. The juxtaposed conductive strips 32*a* to 32*n* are surrounded by an additional electrode 33. The control electrode assembly 20*a* is further provided with intermediate conductive strips 34*a* to 34*n* surrounding respective through holes 31*a* to 31*n* as shown in FIG. 7, and a lower electrode 35.

The additional electrode 33 may be grounded directly or by way of a resistance (not shown). If the additional electrode 33 is not provided, an excessive amount of corona ions are accumulated on a conductive strip which is electrically opened to excessively charge the strip and a discharge will be generated between the strip and a strip adjacent thereto. The additional electrode 33 lets the excessive corona ions escape to prevent the undesirable discharge as well as to control the amount of corona ions passing through the holes 31*a* to 31*n*.

Figure 8:
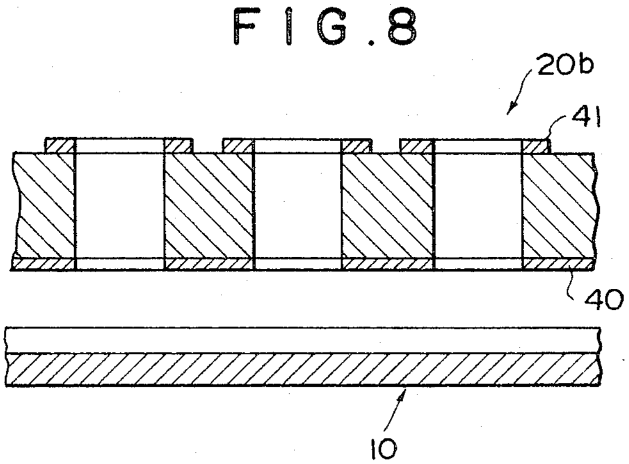
FIG. 8 is a cross-sectional view of another example of the control electrode assembly.

In FIG. 5, the control electrode assembly 20 is provided with a third conductive electrode, i.e., the lower conductive electrode 24, and the electric field for controlling the size of the dot is established between the lower conductive electrode 24 and the electrostatic recording medium 10. However, a control electrode assembly without the third conductive electrode as shown in FIG. 8 may be used. When using a control electrode assembly 20*b* of FIG. 8, the electric field for controlling the size of the dot is established between the lower conductive electrode 40 and the uniformly charged recording medium 10. The electric field for modulating the corona ion current is established between the lower electrode 40 and the upper conductive electrode 41.

As the control electrode assembly, a commercially available laminated plate can be used, or it may comprise an insulating material and metal films, as of copper bonded or plated on opposite sides thereof. Further, it has been found that the insulating material should have resistivity of at least $10^8\Omega$, preferably of $10^8\Omega$ to $10^{16}\Omega$. The thickness of the insulating material is preferred to be from 0.05 mm to 3 mm, and the thickness of the metal film is preferred to be from several $\mu$ to $200\mu$. The diameter of the through hole in the control electrode assembly preferably is 0.2 mm to 4.0 mm.

When the resistivity of the insulating material is less than $10^8\Omega$, the charge of the corona ions adhering to the inner wall surface of the through hole is apt to be electrically absorbed by the insulating material and accordingly it is difficult to establish the electric field within the through hole. If a sufficient electric field is not established when the corona ions are to be deposited on the recording medium, the corona ions cannot be accelerated. This results in insufficient charge density and low quality of an image. On the other hand, if a sufficient electric field is not established when the corona ions are not to be deposited on the recording medium, some corona ions would adversely reach the recording medium, which would also lower quality of the image.

The amount of the corona ions passing through the hole in the control electrode assembly when the uniform charge is not supplied to the recording medium is determined by the diameter of the hole, the space between the control electrode and the recording medium, the thicknesses of the insulating material and the conductive electrodes, and the like. It has been experimentally confirmed that the corona ion current can be completely prevented from flowing through the through hole or allowed to flow solely by the electric field established within the through hole when the thickness of the insulating material is 0.05 mm to 3 mm, the thickness of the conductive electrode is several $\mu$ to $200\mu$ and the diameter of the through hole is $0.2\phi$ to $4.0\phi$. Further, it has been experimentally confirmed that an electrostatic latent image having a sufficient amount of charge can be obtained even if the recording medium is not supplied with the uniform charge.

Further, as described above, the electric field established in the through hole when the corona ion current is to be prevented from flowing therethrough should be sufficiently strong to prevent the flow of the corona ion current even when the recording medium is uniformly charged. It has been experimentally confirmed that a sufficiently strong electric field is established when the conductive electrodes have a thickness of several $\mu$ to $200\mu$ and the insulating material has a thickness of 0.05 mm to 3 mm.

In the experiment, the ratio of thickness of the insulating layer between the upper and intermediate electrodes to that between the intermediate and lower conductive electrodes was varied from 1:1–10 to 1–10:1 with the thickness of the conductive electrodes kept constant. In this experiment, latent images of satisfactory quality having a sufficient amount of charges were obtained over the entires range of the thickness ratio.

Further, it has been experimentally found that a desired amount of charges can be obtained for any speed of formation of a latent image by suitably selecting the thickness of the conductive electrodes and the thickness ratio of the insulating layers.

An experiment was conducted for investigating a relationship between the size of the dot and the potential of the recording medium. In the experiment the corona ion current was modulated using a control electrode assembly shown in FIG. 7. The control electrode assembly was spaced from the recording medium by 1 mm and the recording medium was transferred at a speed of 30 m/minute. The resulting latent image was developed by a cascade developing method and then the size of the charged dot was measured.

The recording medium was charged in advance and the obtained potential was measured by a surface potential meter. Varying the potential in a wide range, the size of the charged dot was measured. The experiment was conducted for three different diameters of the through holes, namely $2.3\phi$, $1.5\phi$ and $1.0\phi$. The results were as shown in FIG. 9.

Figure 9:
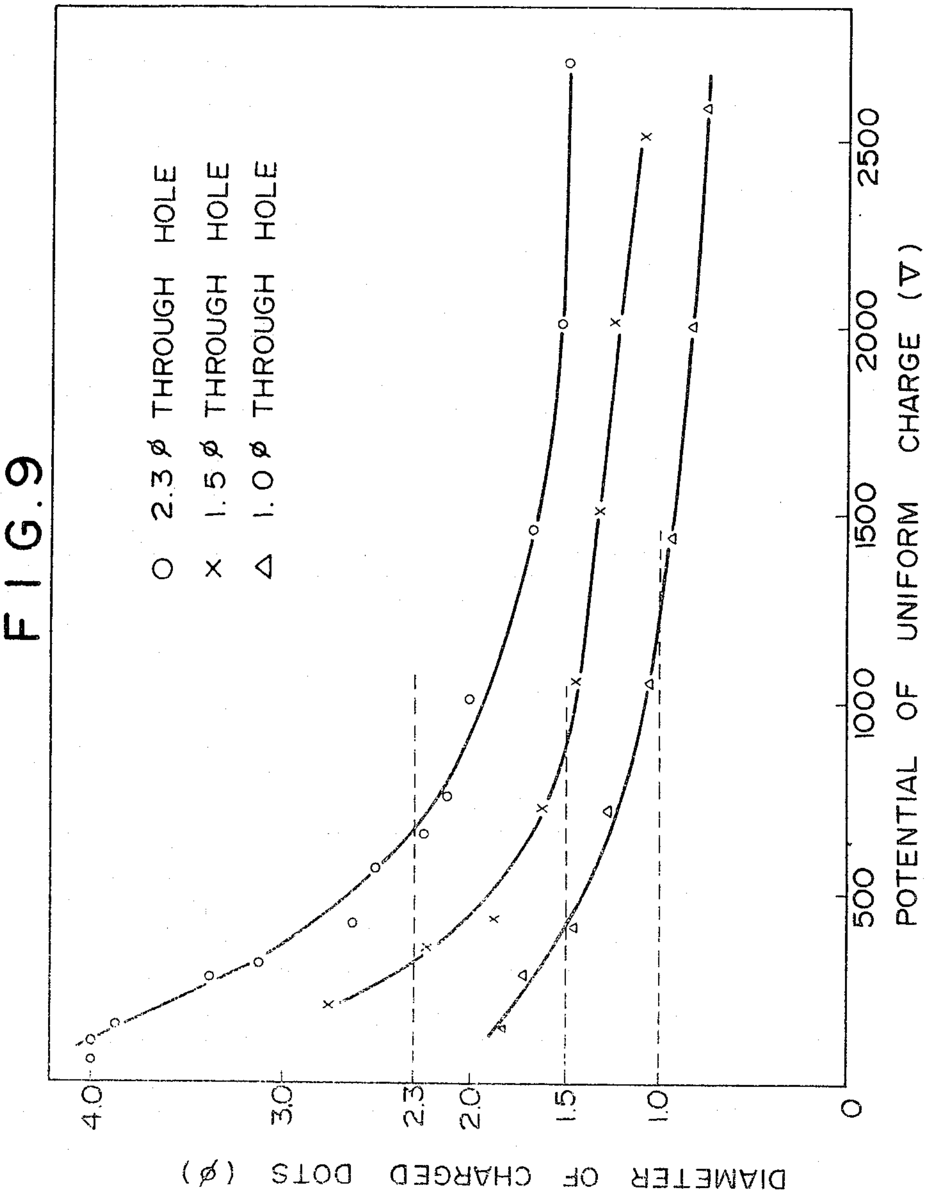
FIG. 9 is a graph showing a relationship between the potential of the uniform charge on an electrostatic recording medium and the size of the dots forming an electrostatic image.

As can be seen from the graph shown in FIG. 9, the size of the dot can be changed from a size larger than the diameter of the through hole to a size smaller than the same by changing the potential of the uniform charge of the recording medium.

It has been also found that the potential of the uniform charge should not be higher than 4000 V, since when the potential is higher than 4000 V, electric discharge occurs between the recording medium and the control electrode assembly.

Another experiment similar to the above experiment was conducted using three different control electrode assembly shown in FIG. 8. In this experiment the three control electrodes were provided with through holes of 0.2ϕ, 0.4ϕ and 0.6ϕ, respectively. The space between the control electrodes and the recording medium was kept at 0.5 mm. Also in this experiment, it was confirmed that the size of the dot can be changed from a size larger than the diameter of the through hole to a size smaller than the same by changing the potential of the uniform charge of the recording medium.

Although in the above description the present invention has been described using positively charged corona ions by way of example, negatively charged corona ions may be used and charged toner particles may also be used instead of the corona ions.

We claim:

1. In a method of forming an electrostatic image on an electrostatic recording medium including the steps of passing image forming charged particle current through a through hole having an inner wall surface in a control electrode assembly having at least two conductive electrodes interposing therebetween an insulating material and surrounding the through hole and modulating the said current with an electric field established within the through hole in accordance with an image signal representing the image to be formed on the recording medium, the improvement which comprises (a) connecting a first one of the conductive electrodes to a reference voltage and disconnecting from said reference voltage a second one of the conductive electrodes so that a portion of the image forming charged particles establish said electric field in a first direction in the through hole to thereby facilitate the flow of the remaining image forming charged particles through the through hole or (b) connecting said second one of the conductive electrodes to said reference voltage and disconnecting from said reference voltage the first one of the conductive electrodes so that a portion of the image forming charged particles establish said electric field in the through hole in a direction substantially opposite to said first direction to thereby inhibit the flow of the remaining image forming charged particles through the through hole.

2. A method as defined in claim 1 which said image forming charged particles are corona ions.

3. A method as defined in claim 1 in which said image forming charged particles are toner particles.

4. A method as defined in claim 2 or 3 in which said insulating material has resistivity of not less than $10^8\Omega$.

5. A method as defined in claim 4 in which the insulating material has resistivity of $10^8\Omega$ to $10^{16}\Omega$.

6. A method as defined in claim 2 or 3 in which said insulating material has a thickness of 0.05 mm to 3 mm.

7. A method as defined in claim 2 or 3 in which said conductive electrode has a thickness of several $\mu$ to $200\mu$.

8. A method as defined in claim 2 or 3 in which said through hole has a diameter of not larger than 4 mm.

9. A method as defined in claim 1 in which an additional electric field is established between the control electrode assembly and the electrostatic recording medium, and the size of the charged dot for forming the electrostatic image is controlled by the additional electric field.

10. A method as defined in claim 9 where the image forming particles have a predetermined polarity and in whichd the recording medium is uniformly charged in advance in a polarity opposite to the polarity of said image forming particles and the additional electric field is established between the uniformly charged recording medium and one of the conductive electrodes adjacent thereto, by virtue of the uniform charge.

11. A method as defined in claim 9 in which a third one of said conductive electrodes is provided between the recording medium and the edge of the through hole adjacent to the recording medium and where the image forming particles have a predetermined polarity, the recording medium is uniformly charged in advance in a polarity opposite to the polarity of said image forming particles and the additional electric field is established between the additional conductive electrode and the recording medium by virtue of the uniform charge, and the additional conductive electrode is connected to said reference voltage.

12. A method as defined in claim 1 where said reference voltage is ground.

* * * * *